C. F. MAISCH.
CAR FENDER.
No. 11,637. Reissued Nov. 9, 1897.
Fig. 4.
Fig. 1.
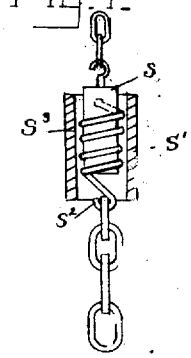
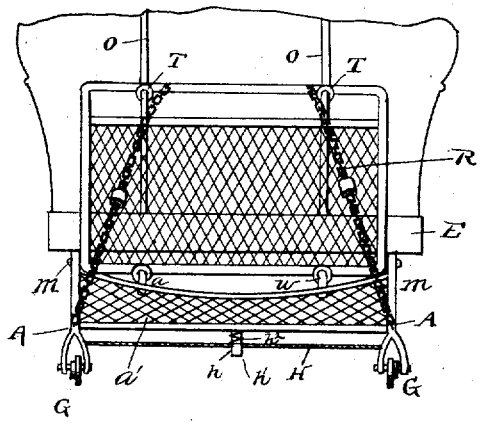
Fig. 2.
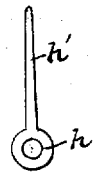
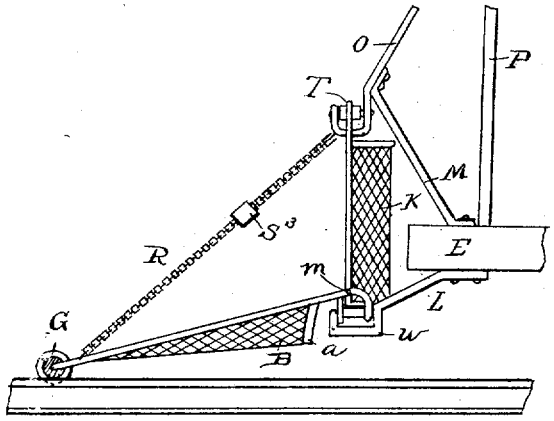
Fig. 3.
Witnesses
Grace C. Gamble
A. E. Marschalk.
Inventor
Charles F. Maisch
Edgar Tate & Co.
Attorneys.
THE NORRIS PETERS CO., PHOTO-LITHO., WASHINGTON, D. C.

BEST AVAILABLE COPY

UNITED STATES PATENT OFFICE.

CHARLES F. MAISCH, OF PHILADELPHIA, PENNSYLVANIA.

CAR-FENDER.

SPECIFICATION forming part of Reissued Letters Patent No. 11,637, dated November 9, 1897.

Original No. 571,779, dated November 24, 1896. Application for reissue filed March 18, 1897. Serial No. 628,236.

*To all whom it may concern:*

Be it known that I, CHARLES F. MAISCH, a citizen of the United States, residing at Philadelphia, county of Philadelphia, and State of Pennsylvania, have invented certain new and useful Improvements in Car-Fenders, of which the following is a full and complete specification, such as will enable those skilled in the art to which it appertains to make and use the same.

This invention relates to fenders or guards for tramway-cars; and the object thereof is to provide an effective device of this class which is simple in construction and operation and which is adapted to prevent serious and fatal accidents which frequently results from striking a person by such cars while in motion.

This invention is fully disclosed in the following specification, of which the accompanying drawings form a part, in which—

Figure 1 is a view, partially in section, showing the means for holding the chains yieldingly taut. Fig. 2 is a detail view of the bolt secured to the fender-frame and through the head of which passes the striker-cord H. Fig. 3 is a side view of my improved fender, and Fig. 4 is a front view thereof.

In the practice of my invention I provide a main fender or guard frame composed of side bars A, a rear curved bar *a*, and a front bar *a'*. The side bars A of the frame are extended forward and provided with forks or bearings in which are mounted rollers G, which are adapted to travel on the rails of the track, and extending from one of these forks or bearings to the other is a cord or chain H, which passes through a head *h* of the bolt *h'*, which latter is longitudinally movable through a perforation formed in the cross-bar *a'* of the fender-frame, a helical spring *h''* being arranged upon the bolt *h'* to retard its rearward movement, so that the person who happens to be in the way will be struck by the yielding chain or cord H, as will be readily understood, and thrown on the main body portion B of the fender-frame, which is composed, preferably, of wire mesh. I also provide a supplemental frame K, supported on rollers T, connected with braces or stays O and M, and similar rollers W are also provided on the bottom of said supplemental frame, said rollers being supported by the braces or rods L, secured to or connected with the platform of a car in any desired manner, and it will be understood that the main fender-frame is pivotally connected with the lower portion of the supplemental frame, as shown at *m*, and by means of the rollers T and W, before mentioned, by which the supplemental frame is supported, the lateral movement of said frame is provided, as also the main frame which is connected therewith, and this movement is also of great advantage in turning corners or short curves, as will be readily appreciated.

Upon reference to Figs. 1 and 3 it will be seen that I have provided means for holding the chains R yieldingly, which means consist of a short cylinder S, placed intermediate the ends of the chain sections, one end of one chain section being connected with said cylinder, while the other end of the cylinder has connection with the fender-frame attached to the car. One end of the second chain section is attached to one corner of the forward fender portion, while the other end has connection with a hook S'' of a helical spring S', which spring encircles the cylinder S and is attached thereto. An inclosing casing $S^3$ is arranged to cover the spring and adjacent portions of the cylinder. Side chains R are also employed, one on each side of the main fender-frame, which chains are connected with the forward portions of the main frame and extending upwardly and backwardly are connected with the upper portion of the supplemental frame, the object of these chains being to prevent excessive downward movement of the main frame and prevent its total displacement in the event of its wheels leaving the track.

The operation of the invention will be readily understood from the foregoing description when taken in connection with the accompanying drawings, and it will be seen that I accomplish the object of my invention by means of a device which is simple in construction and operation and well adapted to accomplish the use for which it is intended.

My invention is not limited to the exact form, construction, and arrangement of parts shown and described, and I therefore reserve the right to make all such changes therein and modifications thereof as fairly come within the scope of the invention.

Having fully described my invention, I claim as new and desire to secure by Letters Patent—

1. The combination with a car of a main fender-frame projecting forwardly thereof and having rollers adapted to travel on the rails of a track of a supplemental frame pivotally connected with the main frame and supported at the front of the car to move laterally thereof on rollers.

2. The combination with a car, of a supplemental fender-frame supported in rollers in front thereof, and a main fender-frame, the rear end of which is pivotally connected with the lower side of said supplemental frame, said main frame being projected forward and provided with rollers which are adapted to travel on the rails of the track, and said supporting-rollers of the supplemental frame being supported by braces connected with the platform of the car, and with the dashboard, substantially as shown and described.

3. The combination with a car, of a supplemental fender-frame supported in rollers in front thereof, and a main fender-frame, the rear end of which is pivotally connected with the lower side of said supplemental frame, said main frame being projected forward and provided with rollers which are adapted to travel on the rails of the track, and said supporting-rollers of the supplemental frame being supported by braces connected with the platform of the car, and with the dashboard, and the forward end of the main fender-frame being connected with the upper portion of the supplemental frame, by means of side chains, substantially as shown and described.

In testimony that I claim the foregoing as my invention I have signed my name, in presence of the subscribing witnesses, this 22d day of January, 1897.

CHAS. F. MAISCH.

Witnesses:
F. W. LIEDTKE,
JOSEPH SMALL.